(12) United States Patent
Barrenscheen

(10) Patent No.: US 7,702,822 B2
(45) Date of Patent: Apr. 20, 2010

(54) PROCESS FOR OPERATING A SYSTEM MODULE AND SEMI-CONDUCTOR COMPONENT

(75) Inventor: Jens Barrenscheen, München (DE)

(73) Assignee: Infineon Technologies AG, Munich (DE)

( * ) Notice: Subject to any disclaimer, the term of this patent is extended or adjusted under 35 U.S.C. 154(b) by 257 days.

(21) Appl. No.: 11/288,441

(22) Filed: Nov. 29, 2005

(65) Prior Publication Data

US 2006/0117118 A1 Jun. 1, 2006

(30) Foreign Application Priority Data

Nov. 30, 2004 (DE) .................... 10 2004 057 788

(51) Int. Cl.
*G06F 3/00* (2006.01)
*G06F 13/00* (2006.01)

(52) U.S. Cl. ..................... 710/14; 710/110

(58) Field of Classification Search .............. 710/14; 711/103

See application file for complete search history.

(56) References Cited

U.S. PATENT DOCUMENTS

| | | | | |
|---|---|---|---|---|
| 5,623,506 A | * | 4/1997 | Dell et al. | 714/766 |
| 5,815,458 A | * | 9/1998 | Chevallier et al. | 365/230.06 |
| 6,070,262 A | * | 5/2000 | Kellogg et al. | 714/763 |
| 6,292,868 B1 | * | 9/2001 | Norman | 711/103 |
| 6,529,486 B1 | | 3/2003 | Barnes et al. | |
| 6,838,331 B2 | * | 1/2005 | Klein | 438/238 |
| 2003/0158983 A1 | * | 8/2003 | Dalakuras et al. | 710/107 |

FOREIGN PATENT DOCUMENTS

DE 10055163 A1 7/2002

OTHER PUBLICATIONS

Howe, Denis, Apr. 22, 1995, The Free On-Line Dictionary of Computing "FOLDOC", http://foldoc.org/, page relating to search query "flash rom".*

* cited by examiner

*Primary Examiner*—Henry W. H. Tsai
*Assistant Examiner*—Titus Wong
(74) *Attorney, Agent, or Firm*—Slater & Matsil, L.L.P.

(57) ABSTRACT

The invention relates to a semi-conductor component, in particular a semi-conductor component configured to be connected with a bus, in particular a LIN bus system, as well as a process for operating a system module, configured to be connected with a bus, in particular a LIN bus system, which includes emitting a data record and allocated check bits while operating the system module in a first operating mode, such that to operate the system module in a second operating mode, check bits differently generated in comparison with the first operating mode are used.

16 Claims, 2 Drawing Sheets

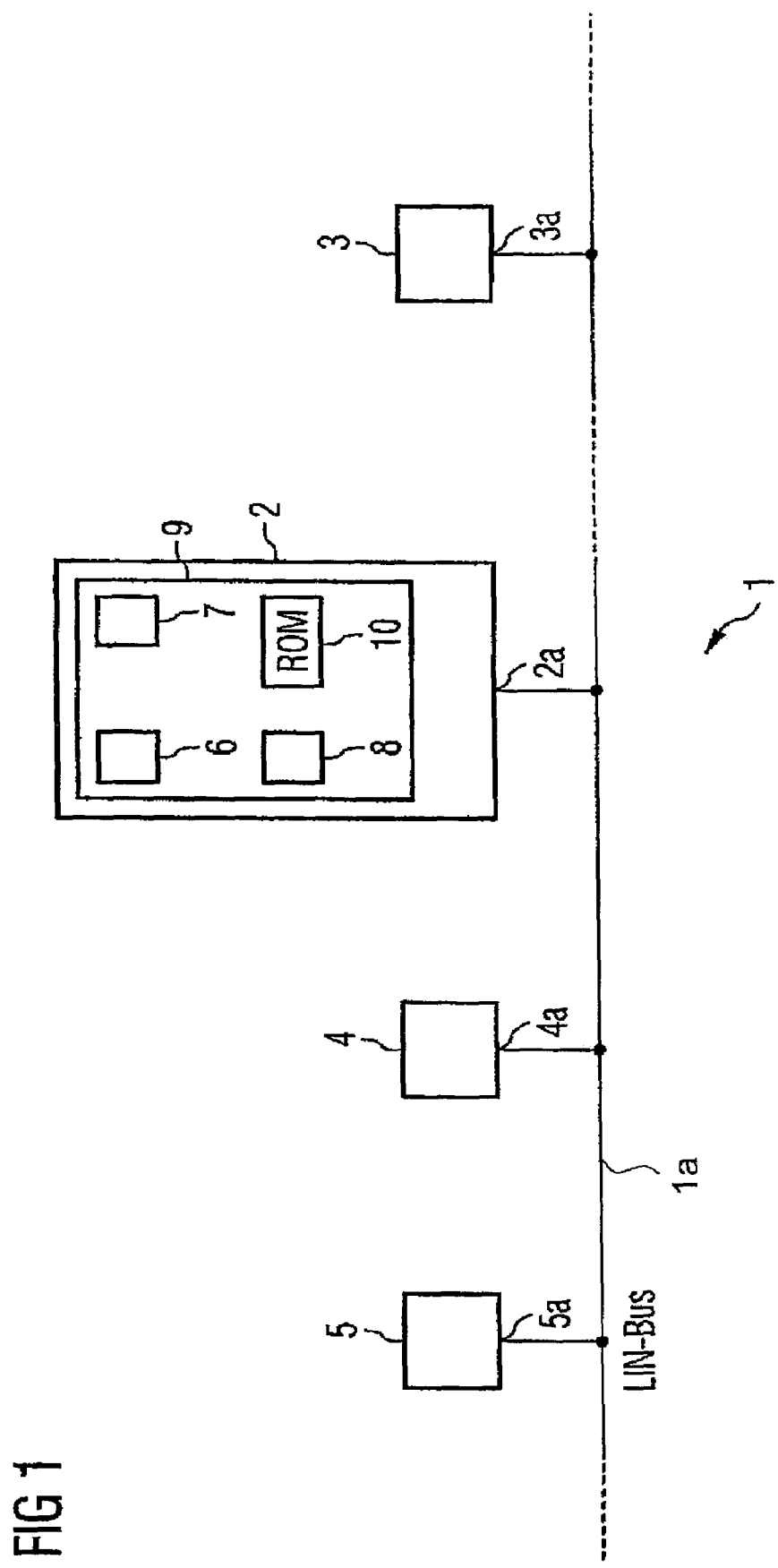

PROCESS FOR OPERATING A SYSTEM MODULE AND SEMI-CONDUCTOR COMPONENT

CLAIM FOR PRIORITY

This application claims the benefit of priority to German Application No. 10 2004 057 788.9, filed Nov. 30, 2004.

TECHNICAL FIELD OF THE INVENTION

The invention relates to a semi-conductor component and process for operating a system module configured for connection with a bus system.

BACKGROUND OF THE INVENTION

In electrical or electronic systems, individual system modules, for instance various electronic assemblies, various electronic components, in each case arranged on an individual assembly (for instance various semi-conductor components arranged on an individual assembly), various sub-components, provided in one and the same component (in particular various elements of a semi-conductor component, for instance of a memory and/or computing circuit, for instance of a micro-controller or micro-processor, etc.) etc., communicate via a transfer medium—for example a bus system—consisting of one or more transfer lines.

Bus systems can be used jointly by several, in particular by two or more than two modules/components/elements.

Many conventional bus systems consist of several partial systems, for example a data bus—consisting of one or more data lines—for the transmission of actual useful data, and/or an address bus—consisting of one or more address lines—for the transmission of address data, and/or a control bus—consisting of one or more control lines—for the transmission of control data, etc.

In comparison to this, a so-called LIN bus system is of a substantially simpler construction (LIN=Local Interconnect Network). A LIN bus system consists in general only of one single transmission line, with a plurality of various assemblies/components/elements able to be connected with it. Consequently both useful data and address and/or control data need to be transmitted via the LIN bus transmission line.

The assemblies/components/elements connected with a LIN bus system usually contain just three inputs; one input for the LIN bus transmission line and two supply voltage inputs.

LIN bus systems can be operated at data rates of for instance up to 20 Kbit/s; these systems are based on master/slave architecture with a single master and one or more slaves.

As a result of the relatively simple and cost-effective construction of LIN bus systems, they are often employed for the control of divided electrical systems in non-critical environments in terms of chronology and/or security, for instance for controlling automotive applications that are non-critical in terms of chronology and/or security.

Possible applications are for instance the micro-controller and/or micro-processor based control of DC and stepping motors for electrical window-winders and wing mirrors, the adjustment of headlight dipping and the management of sensor information for the control of air conditioners or seat positions, etc.

Conventional micro-controller and/or micro-processor systems comprise one or more (central) control and/or computing units (Central Processing Units (CPUs), and/or CPU "cores"), which are connected with one or more memory devices, for instance with a program and a data storage device ("program memory", and "data memory").

The memory devices can be provided on one and the same chip as the corresponding micro-controller and/or micro-processor (a so-called "embedded" micro-controller and/or micro-processor system), or alternatively also separately to them.

The "program memory" in particular contains the sequence of commands to be processed by a CPU core or cores, i.e. the program (and in addition where appropriate data constants to be used by the CPU core(s)).

In the "data memory" for instance the variables—in particular those that may need to be modified during the processing of the program by the CPU core(s)—can be stored.

In terms of LIN bus protocol, in principle any combination of data length and content is allowed; no control words have been pre-specified in terms of protocol. Instead of this corresponding control words must be—individually—laid down for each application.

With conventional LIN bus micro-processor systems a basic program must first be loaded into the program memory; only then is the micro-processor system connected with the LIN bus system.

By transferring a special control word—"known" to the basic program (application-specific, and if required, differing in each case)—via the LIN bus transmission line, the corresponding micro-processor can be brought from a normal operating mode into a programming mode; only then can the actual and/or client-specific program be transferred to the micro-processor via the LIN bus transmission line and stored in the above program memory.

What is a disadvantage however is inter alia, that the basic program must be loaded into the program memory before the micro-processor system is connected with the LIN bus system, so that the micro-processor can recognize a data sequence, transferred via the LIN bus transmission line, as the control word for the change-over into the programming mode.

SUMMARY OF THE INVENTION

The invention discloses a process available for operating a system module configured to be connected with a bus, in particular a LIN bus system, as well as a novel semi-conductor component able to be connected with a bus system.

In one embodiment of the invention, there is a process for operating a system module, configured to be connected with a bus, in particular a LIN bus system, including emitting a data record and allocated check bits while operating the system module in a first operating mode; and to operate the system module in a second operating mode, check bits differently generated in comparison with the first operating mode are used.

It is advantageous when the first operating mode is for instance a normal operating mode and the second operating mode a programming operating mode.

Preferably, the data received by the system module in the second operating mode is used as programming data, in particular for loading and/or modifying and/or erasing a module software program, and the data received in the first operating mode as normal useful and/or application data.

In another embodiment of the invention, a semi-conductor component, configured to be connected with a bus, in particular a LIN bus system is made available, which comprises a device for detecting whether received check bits have been created differently to check bits used in a first operating mode.

It is advantageous for the device to comprise a ROM.

It is also preferable for the ROM to be a start ROM of the semi-conductor element.

BRIEF DESCRIPTION OF THE DRAWINGS

The invention is described below in more detail with the aid of exemplary embodiments and the attached figures. In the figures:

FIG. 1 shows, as an example, a section of a LIN bus system, and system modules communicating with one another in terms of an embodiment example of the invention connected with it.

DETAILED DESCRIPTION OF THE INVENTION

Figure 2A:
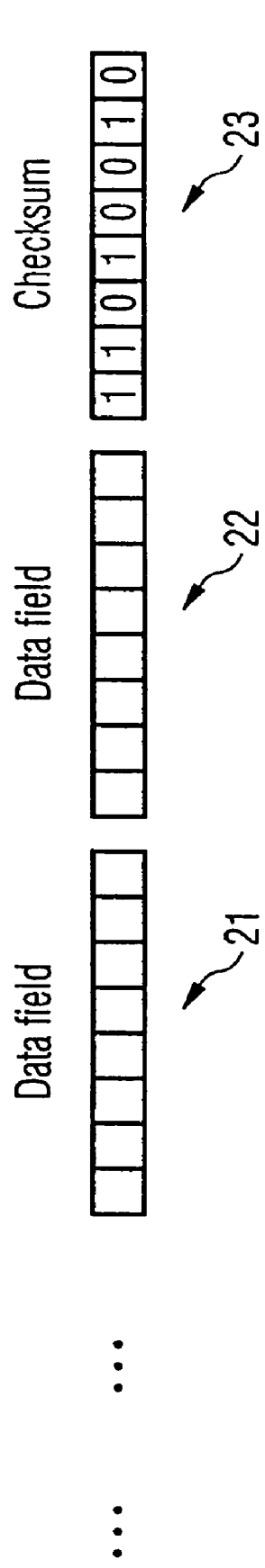
FIG. 2a shows, as an example, a schematic representation of data transmitted by state of the art technology via the LIN bus system shown in FIG. 1.

FIG. 1 shows, as an example, a section of a bus system 1 and system modules 2, 3, 4, 5, connected with it and communicating with one another via the bus system.

The bus system 1 can in principle involve any suitable bus system 1, by means of which the system modules 2, 3, 4, 5—for instance various electronic assemblies, various electronic components in each case arranged on an individual assembly (for instance various semi-conductor components arranged on an individual assembly), various sub-components provided in one and the same component (in particular various elements of a semi-conductor component, for instance a memory and/or computing circuit, for instance a micro-controller or micro-processor, etc.), etc.—can communicate with one another.

Particularly advantageously a LIN bus system (LIN=Local Interconnect Network) can be used as the bus system 1.

The bus system 1 can include a data bus—having one or more data lines—for the transmission of the actual useful data, and/or an address bus—having one or more address lines—for the transmission of address data, and/or a control bus—having one or more control lines—for the transmission of control data, etc., especially advantageously—for instance, when a LIN bus system is used as a bus system, and as shown in FIG. 1—simply one single transmission line 1a, to which a plurality of various assemblies/components/elements can be connected as the system modules 2, 3, 4, 5.

If the bus system 1—as is the case with the LIN bus system 1 shown in FIG. 1—comprises a single transmission line 1a, useful as well as address and/or control data must be transferred via this line.

The system modules 2, 3, 4, 5 connected with the LIN bus system 1 can for instance include three inputs, for instance in each case an input 2a, 3a, 4a, 5a for the LIN bus transmission line 1a, and two voltage supply inputs (which can for instance be connected with a supply voltage line and an earth line (not shown)).

The LIN bus system 1 can—in accordance with the LIN bus specification—be operated for instance with data rates of for instance up to 20 Kbit/s, etc.

The LIN bus system 1 is based on master/slave architecture, more accurately: on single-master/slave architecture, whereby in each case a single system module of those connected with the LIN bus system 1 (for instance the system module 5, or the system module 2 (or any other appropriate system module)) functions as the master, and the remaining system modules connected with the LIN bus system 1 as the slave.

The bus system 1 shown in FIG. 1, and the system modules 2 connected with it, 3, 4, 5 can be advantageously employed for controlling divided electrical systems in' environments that are non-critical in terms of chronology and/or security, for instance for the control of automotive applications (for instance for the control of DC and/or stepping motors for electrical window winders and wing mirrors, headlight dip switches, the management of sensor information for the control of air-conditioners and/or seating positions, etc.) that are non-critical in terms of chronology and/or security.

For instance the system modules 2, 3, 4, 5 connected with the UN bus system 1 shown in FIG. 1 can—especially for instance when used as slave system module—be corresponding LIN bus transceivers and/or corresponding voltage regulator devices and/or corresponding actuator control devices and/or corresponding sensor interfaces and/or corresponding memory devices and/or corresponding memory devices, and/or corresponding micro-controller and/or microprocessor systems, etc.

For instance the system module 2 shown in FIG. 1 (and/or the system module 3, and/or the system module 4, etc.) comprises, where applicable—in addition to a LIN bus transceiver, and/or a voltage regulation device, etc., etc.—a micro-controller and/or micro-processor system 9 with one or more (central) control and/or computing units 8 (central processing unit 8 (CPU), and/or CPU "core"), which are connected with one or more memory devices, for instance with a program memory device 7 and a data storage device 6.

The program and the data storage device 6, 7 can, in the present embodiment example, for instance be provided on one and the same chip as the corresponding micro-controller and/or micro-processor (and/or the CPU 8) (so-called "embedded" micro-controller and/or micro-processor system), or alternatively also separately to it.

The program memory device 7 in particular includes the sequence of the commands to be run by the CPU(s) 8, i.e. the program (and, where applicable, additional corresponding data constants to be used by the CPU(s) 8) (that is, so-called program data).

In contrast to this, variables—in particular those needing to be modified where applicable by the CPU(s) 8 during the running of the program—(and/or corresponding application data) can for instance be stored in the data storage device 6.

The data storage device 6 can for instance be created from one or more RAMs (RAM=Random Access Memory and/or Read-Write memory), in particular for instance DRAMs (DRAM=Dynamic Random Access Memory), or SRAMs (SRAM=Static Random Access Memory).

An appropriate non-volatile memory component, for instance an EPROM (Erasable PROM and/or erasable fixed-value memory) or EEPROM (Electrically Erasable PROM and/or electrically erasable fixed-value memory), in particular for instance a flash EEPROM, can be used for the program memory device 7.

Alternatively for instance a RAM can also be used as a program memory device 7, in particular for instance a DRAM.

In conventional LIN bus micro-processor systems—before connecting a corresponding system module (for instance the system module 2) with the LIN bus system 1—a basic program must first be loaded into the program memory device of a corresponding micro-controller system (for instance into the program memory device 7 of the micro-controller system 9); then the corresponding system module and/or microprocessor system be connected with the LIN bus system 1.

As is more closely described below, this is not obligatory in the present embodiment example; the micro-processor system 9 and/or the system module 2 (and/or one or more further system modules 3, 4, 5) can in other words for instance be connected with the LIN bus system 1 without a program, in particular a basic program being loaded into the program memory device 7 of the corresponding micro-controller system 9 (and—alternatively—as an option also with the program, in particular the basic program, loaded into the memory device 7).

In order to load a program, in particular a basic program, into the program memory device 7 of the micro-processor system 9 via the LIN bus system 1, and/or to modify a program, in particular a basic program stored there, etc., the micro-processor system 9 and/or the system module 2 is brought—by means of the special method more closely described below—from a working and/or a normal operating mode into a programming mode.

FIG. 2a shows, as an example, data transferred—during the normal operating mode—via the LIN bus system 1 shown in FIG. 1 according to state of the art technology in terms of the LIN bus protocol.

As is apparent from FIG. 2a—after, at the start of the transfer process between the master and one of the slaves, where applicable, corresponding header data included in corresponding header data blocks, not shown here, has been transferred (not shown here)—the data blocks 21, 22 including actual useful and/or application data to be transferred from the master to the appropriate slave via the transmission line 1a of the LIN bus system 1 (or conversely (for instance between various slaves)) can be transferred (for instance useful data blocks 21, 22 in succession, each containing one byte of useful data etc., for instance from the system module 5 to the system module 2).

The useful and/or application data included in the useful data blocks 21, 22 can for instance be correspondingly processed in the conventional fashion by the CPU 8, under the control of the program stored in the program memory device 7, and/or stored (beforehand and/or afterwards) in the data storage device 6, etc.

In terms of LIN bus protocol, one or more checkbits can be dispatched at the end of a transfer executed between for instance the master, and the respective slave (and/or at the end of part of a corresponding part of a transfer), for instance in a checksum block 23 (which can for instance contain one byte of checkbits) which includes the checkbits to be transferred from the master to the respective slave (or vice versa).

The checkbits can for instance be calculated by the master and/or slave sending them in each case from the cross sum and/or the weight (that is the number of respective ones) of the useful and/or header data blocks being transferred. For instance—in the case where a useful data block 21, 22 includes an uneven number of ones—a zero can be used as checkbit, and—in the case where a useful data block includes an even number of ones—a one can be used as checkbit (in other words, so-called parity bits can for instance be used as checkbits).

Figure 2B:
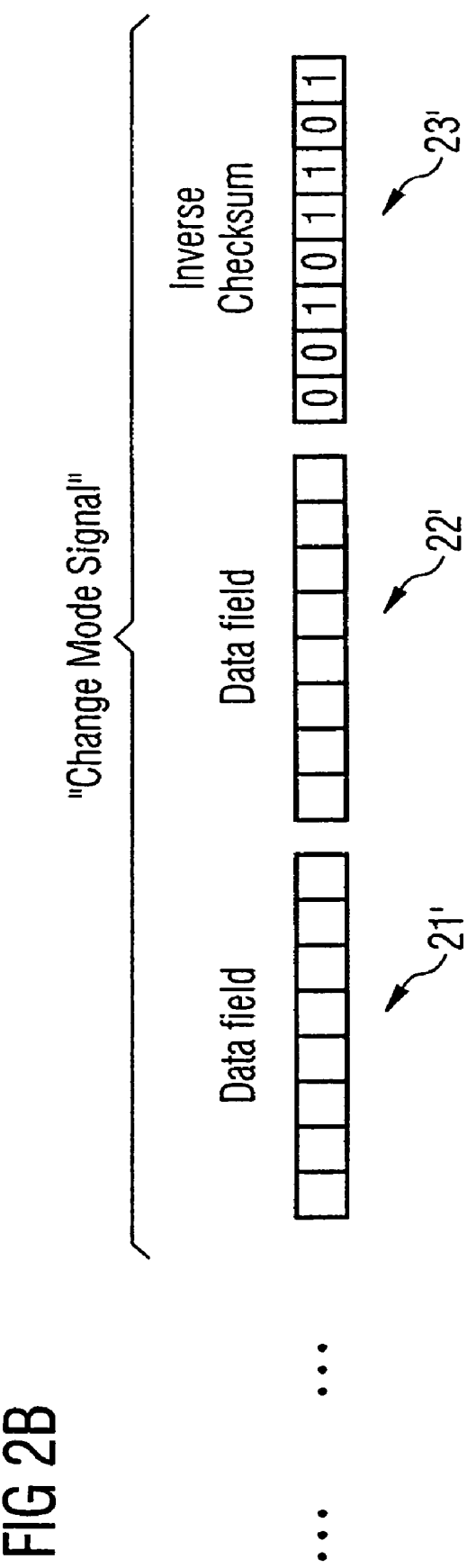
FIG. 2b shows, as an example, data transmitted as a normal operating/programming mode change command in the embodiment example of the invention via the LIN bus system shown in FIG. 1.

FIG. 2b shows, as an example, data transferred via the LIN bus system shown in FIG. 1 as normal operation/programming operation mode change command in an alternative embodiment example of the invention.

As is apparent from FIG. 2b—after, at the start of a transfer executed between the master (for instance the system module 5), and one of the slaves (for instance the system module 2), corresponding header data where applicable contained in corresponding header data blocks, not shown here, has been transferred (not shown here)—correspondingly similar to the conventional fashion for instance corresponding data blocks 21', 22'—corresponding with the useful data blocks 21, 22 shown in FIG. 2a—including corresponding useful and/or application data, and/or advantageously including programming data (and/or corresponding "pseudo" useful data blocks 21', 22' together with "pseudo" useful and/or "pseudo" application data not intended to be used as useful and/or application data, but used as the (first) part of a "normal operation/programming operation mode change command" and/or a "programming operation mode start command", and/or in particular as "programming data") are transferred via the transmission line 1a of the LIN bus system 1 from the master to the respective slave (or vice versa).

As already described above in relation to FIG. 2a, at the end of a transfer executed between the master and the respective slave (and/or at the end of a corresponding part of a transfer) one or more checkbits can be transferred in terms of LIN bus protocol, for instance in a checkbit block 23' (which can for instance include one byte of checkbits) including the checkbits to be transferred from the master to the respective slave (or vice versa).

In order to transfer a "normal operation/programming operation mode change command" in terms of the above embodiment example—as illustrated in FIG. 2b—for instance no checkbits, correspondingly calculated and/or generated as described above, are transferred, but rather checksums calculated and/or generated in a pre-determined, different fashion (i.e.—in total—a checkbit block 23' calculated and/or generated in a pre-determined, different fashion and/or deliberately modified).

For instance (as a further part of a "normal operation/programming operation mode change command") instead of a checksum block 23 calculated and/or generated in the fashion described above, a checkbit block 23', inverted in relation to it, can be used.

In order to calculate the checkbits included in the—inverted—checksum block 23, first for instance, in accordance with what was described above, the cross sum and/or the weight of the (pseudo) useful and/or programming and/or (pseudo) header data blocks can be generated (and/or corresponding parity bits can be calculated) for instance by the respective transferring master and/or slave; next—in contrast to what has been described above—the bits detected in each case are inverted and subsequently used as checkbits to be transferred.

For instance—if a (pseudo) useful and/or programming and/or (pseudo) header data block 21', 22' includes an uneven number of ones—a one can be used as a checkbit instead of a zero, and—in the case where a (pseudo) useful and/or programming and/or (pseudo) header data block 21', 22' includes an even number of ones—a zero can be used as checkbit instead of a one (in other words correspondingly inverted parity bits can be used as checkbits, for instance so that—as illustrated in FIGS. 2a and 2b—instead of a checksum block 23 with for instance the bits "11010010", a checksum block 23' inverted in relation to it with for instance the bits "00101101" is transferred via the transmission line 1a of the LIN bus system 1 from the master to the slave (or vice versa)).

Alternatively or additionally, in order to detect the binary number included in a deliberately modified checksum block 23', a pre-determined offset value (for instance "00001111", etc.) can be added to the binary number (for instance to the binary number representing a particular checksum) included in the conventionally generated checksum block (so that instead of a checksum block 23 with for instance the bits "11010010"—for instance including a corresponding checksum—a checksum block 23' with for instance the bits "1100001" is transferred via the transmission line 1a of the LIN bus system 1 from the master to the slave (or vice versa).

Advantageously, a deliberately modified checksum block 23' should guarantee similar or equally good test coverage and/or test quality as a checksum block 23 constructed in the conventional fashion.

In addition, corresponding checksum blocks 23, 23', constructed in the conventional fashion and deliberately modified, should in each case include binary numbers spaced as far apart from one another as possible (in particular exhibiting the largest possible hamming distance).

Especially when no program has yet been stored in the program storage device 7 of the micro-controller system 9 and/or of the system module 2, in particular a basic program, it is detected under the control of a program—permanently stored in a start ROM 10 of the micro-controller system 9 and/or the system module 2—whether, according to that described above, a "normal operating/programming mode change command" has been transmitted via the LIN bus system 1 (i.e.—as represented in FIG. 2b—corresponding data blocks 21', 22', followed by a checksum block 23' deliberately modified in pre-determined fashion, for instance inverted). With a (basic) program already present and stored in the program storage device 7 this function can alternatively also be assumed by the program stored in the program storage device 7.

When—controlled by the program stored in the start ROM 10 (and/or alternatively: on the program storage device 7)—it is detected that a normal operation/programming operation mode change command (change mode signal) (i.e.—as represented in FIG. 2b—corresponding data blocks 21', 22', followed by a checksum block 23' deliberately modified in a pre-determined fashion, for instance inverted), has been transmitted via the LIN bus system 1 the system module 2, in particular the micro-controller system 9, is brought from the normal operating mode into the programming mode.

Data transmitted after (and/or just before) the deliberately modified, for instance inverted, checksum block 23' (in particular data included in the data blocks 21', 22' allocated to the checksum block 23') is not regarded by the system module 2, in particular the micro-controller system 9, as ordinary useful and/or application data, but as programming data (the data contained in corresponding data blocks (for instance data as correspondingly shown in FIG. 2a and/or 2b and transmitted via the LIN bus system 1) is thereby clearly identified by the deliberately modified, for instance inverted, checksum block 23' as programming data).

Alternatively data received by the system module 2 brought into the programming mode in the above fashion, and which data is intended for the module, can be regarded and/or interpreted as programming data.

The data transmitted via the LIN bus system 1 and intended for the system module 2 can then conform with LIN bus specification (alternatively still however allocated to a checksum block 23' created in a modified way); this data can in any event have another meaning assigned to it (for instance a "Change Mode Back" function (see below)) than the corresponding data in the LIN bus protocol and/or in the normal operating mode.

The data transmitted in the above fashion via the LIN bus system 1 and in each case clearly identified as programming data (and/or alternatively interpreted as such in the programming mode as explained) can be stored in the program storage device 7 of the system module 2 and/or of the micro-controller system 9, i.e. for instance used for the (initial) loading of a basic program into the program storage device 7 of the system module 2 and/or the micro-controller system 9, after the system module 2 and/or the micro-controller system 9 has been connected with the LIN bus system 1 (and/or to modify a basic program present there, and/or to load the actual and/or client-specific program into the program storage device 7 of the system module 2 and/or the micro-controller system 9, and/or to modify a corresponding client-specific program accordingly).

In order to bring the system module 2, in particular the micro-controller system 9 (back) from the programming mode into the normal operating mode, a conventional (non-inverted) checksum block 23 shown in FIG. 2a and deliberately modified in the above fashion, can for instance be used again—instead of the inverted checksum block 23' shown in FIG. 2b—(whereby the data transmitted via the LIN bus system 1 can be clearly identified as ordinary useful and/or application data).

Advantageously, in order to bring the micro-controller system 9 (back) from the programming mode to the normal operating mode, data conforming with LIN bus specifications is emitted instead (where needed, together with a corresponding, for instance inverted, checksum block 23'), whereby this data in a programming mode (not however in the normal operating mode) has had the meaning of a programming operating/normal operating mode (back) command ("Change Mode Back Signal") assigned to it.

Conventional (LIN) bus system modules not supporting the above normal operating/programming operating mode change command ("Change Mode Signal") (and the above programming operating/normal operating mode (back) change command ("Change Mode Back Signal")) (in particular system modules not comprising a corresponding start ROM 10 and/or no normal operating/programming mode change control program operating in the above fashion) can be (additionally) connected with the LIN bus system 1 and operated in the usual fashion (but can however not be brought from a normal operating mode into a programming operating mode in the above special fashion, and will ignore a corresponding "Change Mode Signal" and/or "Change Mode Back Signal" transmitted via the LIN bus system 1).

REFERENCE NUMBERS

1 LIN bus system
1a Transmission line
2 System module
2a Input
3 System module
3a UN bus input
4 System module
4a LIN bus input
5 System module
5a LIN bus input
6 Data storage device
7 Program storage device
8 CPU
9 Micro processor system
10 Start ROM
21 Useful data block
21' Program data block
22 Useful data block
22' Program data block
23 Checksum block
23' Inverted checksum block

What is claimed is:

1. A process for operating a system module configured to be connected with a bus, comprising:
   generating allocated check bits based on a data record;
   emitting the data record and the allocated check bits if operating the system module in a first operating mode, wherein the first operating mode comprises a normal operating mode, and wherein a data error can be detected by the system module based on the emitted data record and the allocated check bits;
   transforming the allocated check bits into transformed check bits according to a predetermined algorithm, the predetermined algorithm comprising inverting the allocated check bits, if operating the system module in a second operating mode; and
   emitting the data record and the transformed check bits if operating the system module in the second operating mode, wherein
   the bus comprises a Local Interconnect Network Bus,
   the second operating mode further comprises a programming mode, the programming mode comprising writing to a program memory in the system module from the bus,
   a data error can be detected by the system module based on the transformed check bits in the second operating mode, and
   the system module comprises a micro-processor or a micro-controller.

2. The process according to claim 1, wherein writing to the program memory comprises loading, modifying or deleting a module software program.

3. The process according to claim 1, wherein data received by the system module in the first operating mode comprises normal application data.

4. The process according to claim 1, wherein generating the allocated check bits comprises calculating a cross sum or weight of data comprised in one or more data records.

5. The process according to claim 1, wherein the allocated check bits comprise parity bits.

6. A semi-conductor component configured to be connected with a Local Interconnect Network (LIN) bus system, comprising:
   a first device for receiving check bits and for detecting whether the received check bits have been transformed according to a predetermined algorithm, the predetermined algorithm designating a mode of operation, wherein the mode of operation comprises a programming mode, the programming mode comprising writing to a program memory in a system module from the LIN bus system, wherein the first device is configured to receive from a second device, the second device configured to:
   emit a data record and the check bits if operating the first device in a first operating mode, wherein the first operating mode comprises a normal operating mode, and wherein the first device detects a data error based on receiving the emitted data record and the check bits;
   transform the check bits into transformed check bits according to the predetermined algorithm, the predetermined algorithm comprising inverting the check bits, if operating the first device in a second operating mode, and
   emit the data record and the transformed check bits if operating the first device in the second operating mode; wherein,
   the first device detects a data error based on receiving the data record and the transformed check bits in the second operating mode, and
   the first device comprises a micro-processor or a micro-controller.

7. The semi-conductor component according to claim 6, wherein the first device comprises a read only memory.

8. The semi-conductor component according to claim 7, wherein the read only memory comprises a start read only memory.

9. The semi-conductor component according to claim 7, wherein a control program is stored on the read only memory to detect whether the received check bits have been transformed according to the predetermined algorithm.

10. A method of operating an electronic device, the method comprising:
    operating the electronic device in a first mode, operating the electronic device in the first mode comprising,
        providing a first data record, the first data record comprising first data bits,
        generating a first set of check bits associated with the first data record,
        transmitting the first data record and the first set of check bits on a data bus, the data bus comprising a Local Interconnect Network Bus,
        receiving the first data record and the first set of check bits from the data bus, and
        setting a system mode to the first mode; and
    operating the electronic device in a second mode, operating the electronic device in the second mode comprising,
        providing a second data record, the second data record comprising second data bits,
    generating a second set of check bits associated with the second data record,
        transforming the second set of check bits into a set of transformed check bits according to a predetermined algorithm, wherein the predetermined algorithm comprises inverting the second set of check bits,
        transmitting the second data record and the set of transformed check bits on the data bus,
        receiving the second data record and the set of transformed check bits from the data bus,
        detecting that the set of transformed check bits comprises a transformed set, and
        setting the system mode to the second mode, wherein the second mode comprises a programming mode, the programming mode comprising writing to a program memory in the system module from the data bus, wherein
        operating the electronic device in the first mode further comprises detecting a data error based on receiving the first data record and the first set of check bits,
        operating the electronic device in the second mode further comprises detecting a data error based on receiving the second data record and the set of transformed check bits, and
        the electronic device comprises a micro-processor or a micro-controller.

11. The method of claim 10, wherein the predetermined algorithm further comprises adding a fixed offset to the second set of check bits.

12. A process for operating a system module configured to be connected to a data bus, the process comprising:
    generating first allocated check bits based on a first data record, wherein the first allocated check bits are generated according to a first predetermined algorithm if the system module is to be operated in a first operating mode;

after generating the first allocated check bits, emitting the first data record and the first allocated check bits;

generating second allocated check bits based on a second data record, wherein the second allocated check bits are generated according to a second predetermined algorithm if the system module is to be operated in a second operating mode, the second predetermined algorithm comprising inverting the second allocated check bits;

after generating the second allocated check bits, emitting the second data record and the second allocated check bits;

after emitting the second data record and the second allocated check bits, receiving the second data record and the second allocated check bits;

after receiving the second data record and the second allocated check bits, determining whether the second allocated check bits were generated according to the second predetermined algorithm; and operating the system module in the second operating mode if the second allocated check bits were determined to have been generated according to the second predetermined algorithm, wherein operating the system module in the second operating mode comprises writing to a program memory in the system module from the data bus, the writing comprising loading, modifying, or deleting a module software program in the program memory, wherein operating the system module in the first mode further comprises detecting a data error based on receiving the first data record and the first allocated check bits;

operating the system module in the second mode further comprises detecting a data error based on receiving the second data record and the second allocated check bits, the data bus comprises a Local Interconnect Network Bus, and the system module comprises a micro-processor or a micro-controller.

13. The process according to claim 1, wherein the data record comprises programming data if the system module is operating in the second operating mode.

14. The method of claim 10, wherein the second data record comprises programming data.

15. A process for operating a system module configured to be connected with a bus, the process comprising:

generating first allocated check bits based on a first data record, wherein the first allocated check bits are generated according to a first predetermined algorithm if the system module is to be operated in a first operating mode;

emitting the first data record and the first allocated check bits;

generating second allocated check bits based on a second data record, wherein the second allocated check bits are generated according to a second predetermined algorithm if the system module is to be operated in a second operating mode, the second operating mode comprising a programming mode, the programming mode comprising writing to a program memory in the system module from the bus, wherein generating the second allocated check bits according to the second predetermined algorithm comprises inverting check bits generated according to the first predetermined algorithm based on the second data record; and emitting the second data record and the second allocated check bits, wherein in the second operating mode, data received by the system module is detected to be used to load or modify or delete a module software program, and in the first operating mode, data received by the system module is detected to be used as normal application data for the software program, wherein in the first operating mode, the system module is detects a data error based on receiving the first data record and the first allocated check bits, and in the second operating mode, the system module is detects a data error based on receiving the second data record and the second allocated check bits, and the system module comprises a micro-processor or a micro-controller.

16. The process according to claim 15, wherein generating the second allocated check bits according to the second predetermined algorithm further comprises adding a predetermined fixed offset value to check bits generated according to the first predetermined algorithm based on the second data record.

* * * * *

UNITED STATES PATENT AND TRADEMARK OFFICE
CERTIFICATE OF CORRECTION

PATENT NO. : 7,702,822 B2
APPLICATION NO. : 11/288441
DATED : April 20, 2010
INVENTOR(S) : Barrenscheen It is certified that error appears in the above-identified patent and that said Letters Patent is hereby corrected as shown below:

In Col. 12, line 31, claim 15, after module delete "is".
In Col. 12, line 34, claim 15, after module delete "is".

Signed and Sealed this

Twenty-second Day of June, 2010

David J. Kappos
*Director of the United States Patent and Trademark Office*